(12) United States Patent
Feng (10) Patent No.: US 10,630,449 B2
(45) Date of Patent: Apr. 21, 2020

(54) PEER-TO-PEER DATA TRANSMISSION METHOD, APPARATUS, AND SYSTEM

(71) Applicant: GUANGDONG OPPO MOBILE TELECOMMUNICATIONS CORP., LTD., Dongguan (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/778,579

(22) PCT Filed: Feb. 5, 2016

(86) PCT No.: PCT/CN2016/073678
§ 371 (c)(1),
(2) Date: May 23, 2018

(87) PCT Pub. No.: WO2017/133000
PCT Pub. Date: Aug. 10, 2017

(65) Prior Publication Data
US 2018/0351723 A1    Dec. 6, 2018

(51) Int. Cl.
*H04L 5/00* (2006.01)
*H04W 8/24* (2009.01)
(Continued)

(52) U.S. Cl.
CPC ......... *H04L 5/0055* (2013.01); *H04B 7/0626* (2013.01); *H04L 1/0026* (2013.01);
(Continued)

(58) Field of Classification Search
CPC ....... H04B 7/024; H04W 76/14; H04W 72/04
See application file for complete search history.

(56) References Cited

U.S. PATENT DOCUMENTS 9,148,887 B2    9/2015  Iwamura
10,136,428 B2*  11/2018 Kim ................ H04W 76/27
(Continued)

FOREIGN PATENT DOCUMENTS

CN    103686691 A    3/2014
CN    104113851 A    10/2014
(Continued)

OTHER PUBLICATIONS

English Translation of International Search Report in international application No. PCT/CN2016/073678, dated Nov. 7, 2016.
(Continued)

*Primary Examiner* — Melanie Jagannathan
(74) *Attorney, Agent, or Firm* — Ladas & Parry, LLP (57) ABSTRACT

The invention provides a peer-to peer data transmission method, apparatus, and system. The method comprises: a transmitting terminal determines a first time-frequency resource configured to transmit data to a receiving terminal; and the transmitting terminal transmits, on the first time-frequency resource, data to the receiving terminal; wherein the transmitting terminal transmits the data to the receiving terminal while transmitting data to other receiving terminals; the transmitting terminal transmits different data to at least one of the other receiving terminals and the receiving terminal; and/or, the transmitting terminal transmits different data to two or more of the other receiving terminals. The embodiment can implement different D2D service interaction for different terminal apparatus combinations.

19 Claims, 6 Drawing Sheets

(51) Int. Cl.
*H04W 72/02* (2009.01)
*H04L 1/00* (2006.01)
*H04L 1/18* (2006.01)
*H04W 4/70* (2018.01)
*H04B 7/06* (2006.01)
*H04W 56/00* (2009.01)

(52) U.S. Cl.
CPC .......... *H04L 1/1854* (2013.01); *H04L 1/1887* (2013.01); *H04W 4/70* (2018.02); *H04W 8/24* (2013.01); *H04W 56/001* (2013.01); *H04W 72/02* (2013.01)

(56) References Cited

U.S. PATENT DOCUMENTS

| | | | |
|---|---|---|---|
| 2012/0076040 A1* | 3/2012 | Hoshino | H04W 24/10 370/252 |
| 2012/0134329 A1* | 5/2012 | Lim | H04L 1/1854 370/329 |
| 2013/0012221 A1 | 1/2013 | Zou | |
| 2014/0004867 A1* | 1/2014 | Noh | H04W 76/14 455/450 |
| 2014/0241199 A1* | 8/2014 | Chun | H04L 5/0035 370/252 |
| 2014/0247796 A1* | 9/2014 | Ouchi | H04L 5/0053 370/329 |
| 2014/0307631 A1* | 10/2014 | Miao | H04L 1/0015 370/328 |
| 2014/0321452 A1 | 10/2014 | Choi et al. | |
| 2014/0341048 A1* | 11/2014 | Sajadieh | H04L 5/0085 370/252 |
| 2014/0362793 A1* | 12/2014 | Chai | H04W 24/00 370/329 |
| 2015/0003263 A1* | 1/2015 | Senarath | H04L 5/0051 370/252 |
| 2015/0023267 A1 | 1/2015 | Lim et al. | |
| 2015/0078279 A1 | 3/2015 | Ko et al. | |
| 2015/0173102 A1* | 6/2015 | Ruiz Delgado | H04L 1/1864 370/280 |
| 2015/0207611 A1* | 7/2015 | Jung | H04J 11/004 370/329 |
| 2015/0222401 A1 | 8/2015 | Xu et al. | |
| 2015/0256307 A1* | 9/2015 | Nagata | H04L 5/0051 370/328 |
| 2015/0289253 A1 | 10/2015 | Pan et al. | |
| 2015/0358139 A1* | 12/2015 | Li | H04W 72/08 370/252 |
| 2015/0373616 A1 | 12/2015 | Fujishiro | |
| 2016/0029238 A1* | 1/2016 | Chen | H04W 24/10 370/252 |
| 2016/0057604 A1 | 2/2016 | Luo et al. | |
| 2016/0112173 A1* | 4/2016 | Wang | H04L 5/0048 370/329 |
| 2016/0205501 A1 | 7/2016 | Lee et al. | |
| 2016/0269160 A1* | 9/2016 | Noh | H04L 5/0048 |
| 2016/0352394 A1* | 12/2016 | Boudreau | H04B 7/024 |
| 2016/0353410 A1* | 12/2016 | Wang | H04W 72/1289 |
| 2017/0019942 A1 | 1/2017 | Ko et al. | |
| 2017/0026100 A1* | 1/2017 | Wang | H04W 72/12 |
| 2017/0264390 A1* | 9/2017 | Liu | H04W 16/28 |
| 2018/0070264 A1 | 3/2018 | Saiwai et al. | |
| 2018/0076873 A1* | 3/2018 | Xiao | H04W 72/082 |
| 2018/0077734 A1* | 3/2018 | Kim | H04L 1/18 |
| 2018/0176892 A1* | 6/2018 | Kim | H04W 72/0406 |
| 2019/0013911 A1* | 1/2019 | Muruganathan | H04L 1/0026 |
| 2019/0014444 A1* | 1/2019 | Lei | H04W 4/02 |
| 2019/0014523 A1* | 1/2019 | Lei | H04W 4/40 |
| 2019/0045369 A1* | 2/2019 | Harada | H04W 16/14 |
| 2019/0045401 A1* | 2/2019 | Zhang | H04W 28/20 |
| 2019/0149290 A1* | 5/2019 | Liu | H04L 5/0044 |

FOREIGN PATENT DOCUMENTS

| | | |
|---|---|---|
| CN | 104349485 A | 2/2015 |
| CN | 104811892 A | 7/2015 |
| CN | 105208662 A | 12/2015 |
| EP | 2928253 A1 | 10/2015 |
| JP | 2012227884 A | 11/2012 |
| JP | 20142244425 A | 12/2012 |
| WO | 2012144545 A1 | 10/2012 |
| WO | 2014003022 A1 | 1/2014 |
| WO | 2015030520 A1 | 3/2015 |
| WO | 2015143170 A1 | 9/2015 |
| WO | 2016186059 A1 | 11/2016 |

OTHER PUBLICATIONS

The Written Opinion of the International Search Authority in international application No. PCT/CN2016/073678, dated Nov. 7, 2016.

LG Electronics, UE Procedure in Mode 1 Communication [online], 3GPP TSG-RAN WG1#78 R1-143181, Internet <URL:http://www.3gpp.org/ftp/tsg_ran/WG1_RL1/TSGR1_78/Docs/R1 / 143181.zip>,Aug. 22, 2014

First Office Action of the Japanese application No. 2018-528281, dated Aug. 16, 2019.

Supplementary European Search Report in the European application No. 16888825.3, dated May 24, 2019.

* cited by examiner

PEER-TO-PEER DATA TRANSMISSION METHOD, APPARATUS, AND SYSTEM

RELATED APPLICATION

This application is an application under 35 U.S.C. 371 of International Application No. PCT/CN2016/073678 filed on Feb. 5, 2016, the entire contents of which are incorporated herein by reference.

TECHNICAL FIELD

Embodiments of the disclosure relate to the field of communications, and more particularly to an end-to-end data transmission method, device and system.

BACKGROUND

Extensive researches on Device to Device (D2D) technologies have been made by multiple organizations for standardization, including Bluetooth, Long Term Evolution (LTE) D2D, Institute of Electrical and Electronics Engineers (IEEE) 802.11p, LTE Vehicle to X (V2X) and the like, and multiple services, such as multimedia data exchange, a social network, public safety, V2X and the like, may be implemented. Compared with a star data distribution-based cellular mobile communication system, a D2D system may fully utilize a proximity relationship between closely located terminals and realize direct communication between the terminals instead of communication with a base station, thereby implementing more detailed space frequency multiplexing and effectively offloading a network burden of the cellular mobile communication system, and the D2D system will play a more and more important role in a future 5th-Generation (5G) communication system.

Meanwhile, along with diversification of wireless communication terminal forms, compared with a single mobile phone form, a relationship between terminals also becomes increasingly diversified, and more and more terminals form a proximity relationship. For example, a distance between a receiving terminal and a sending terminal for V2X is usually dozens to hundreds of meters, a distance between a receiving terminal and a sending terminal of a sensor network in a factory is usually shorter than a hundred meters, and a communication distance of wearable equipment is even below a meter level. In these proximity communication scenarios, a D2D communication system may bear most of traffic, and main data is not required to be transmitted through a base station and a mobile communication network.

However, a present D2D system mainly implements relatively simple broadcast and multicast modes but has yet not implemented D2D communication in a unicast mode. Therefore, a sending end device may not send different data for different receiving end devices and it is impossible to implement different D2D service interaction between different terminal equipment combinations.

SUMMARY

The disclosure provides an end-to-end data transmission method, device and system. In a D2D communication system, a terminal device may send different data to multiple terminal devices at the same time, and thus different D2D service interaction may be implemented between different terminal device combinations.

A first aspect provides an end-to-end data transmission method, which may include that: a sending terminal determines a first time-frequency resource for sending data to a receiving terminal; and the sending terminal sends the data to the receiving terminal on the first time-frequency resource, wherein the sending terminal may send data to other receiving terminals while sending the data to the receiving terminal, and the sending terminal may send data to the other receiving terminals in at least one of the following modes: the data sent to at least one of the other receiving terminals may be different from the data sent to the receiving terminal, or, the data sent to at least two of the other receiving terminals may be different.

A second aspect provides an end-to-end data transmission method, which may include that: a receiving terminal determines a first time-frequency resource for receiving data sent by a sending terminal; and the receiving terminal receives the data sent by the sending terminal on the first time-frequency resource, wherein the sending terminal may send data to other receiving terminals while sending the data to the receiving terminal, and the sending terminal may send data to the other receiving terminals in at least one of the following modes: the data sent to at least one of the other receiving terminals may be different from the data sent to the receiving terminal, or, the data sent to at least two of the other receiving terminals may be different.

A third aspect provides an end-to-end data transmission method, which may include that: a network device receives a resource scheduling request sent by a sending terminal; the network device sends first resource configuration information for the resource scheduling request to the sending terminal, to enable the sending terminal to determine a first time-frequency resource for sending data to a receiving terminal according to the first resource configuration information; and the network device receives first feedback information sent by the receiving terminal, wherein the first feedback information indicates whether the receiving terminal successfully receives the data sent by the sending terminal on the first time-frequency resource.

A fourth aspect provides a sending terminal, which may include: a determination unit, configured to determine a first time-frequency resource for sending data to a receiving terminal; and a transceiver unit, configured to send the data to the receiving terminal on the first time-frequency resource, wherein the transceiver unit may send data to other receiving terminals while sending the data to the receiving terminal, and the transceiver unit may send data to the other receiving terminals in at least one of the following modes: the data sent to at least one of the other receiving terminals may be different from the data sent to the receiving terminal, or, the data sent to at least two of the other receiving terminals may be different.

A fifth aspect provides a receiving terminal, which may include: a determination unit, configured to determine a first time-frequency resource for receiving data sent by a sending terminal; and a transceiver unit, configured to receive the data sent by the sending terminal on the first time-frequency resource, wherein the sending terminal may send data to other receiving terminals while sending the data to the receiving terminal, and the sending terminal may send data to the other receiving terminals in at least one of the following modes: the data sent to at least one of the other receiving terminals may be different from the data sent to the receiving terminal, or, the data sent to at least two of the other receiving terminals may be different.

A sixth aspect provides network device, which may include: a receiving unit, configured to receive a resource scheduling request sent by a sending terminal; and a sending unit, configured to send first resource configuration information for the resource scheduling request to the sending terminal to enable the sending terminal to determine a first time-frequency resource for sending data to a receiving terminal according to the first resource configuration information, wherein the receiving unit may be further configured to receive first feedback information sent by the receiving terminal and the first feedback information may be configured to indicate whether the receiving terminal successfully receives the data sent by the sending terminal on the first time-frequency resource.

A seventh aspect provides an end-to-end data transmission system, which may include the sending terminal of the fourth aspect, the receiving terminal of the fifth aspect and the network device of the sixth aspect.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Each embodiment of the disclosure will be described in combination with terminal equipment and network equipment. The terminal equipment may also be called as an access terminal, a user unit, a user station, a mobile radio station, a mobile station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment and terminal equipment in the future 5G.

The network equipment may be configured to communicate with the mobile equipment. The network equipment may be a Base Transceiver Station (BTS) in a Global System for Mobile Communication (GSM) or Code Division Multiple Access (CDMA), may also be a NodeB (NB) in Wideband Code Division Multiple Access (WCDMA), and may further be an Evolutional Node B (eNB or eNodeB) in LTE, or a relay station or access point, or vehicle-mounted equipment, wearable equipment and network equipment in the future 5G network.

Figure 1:
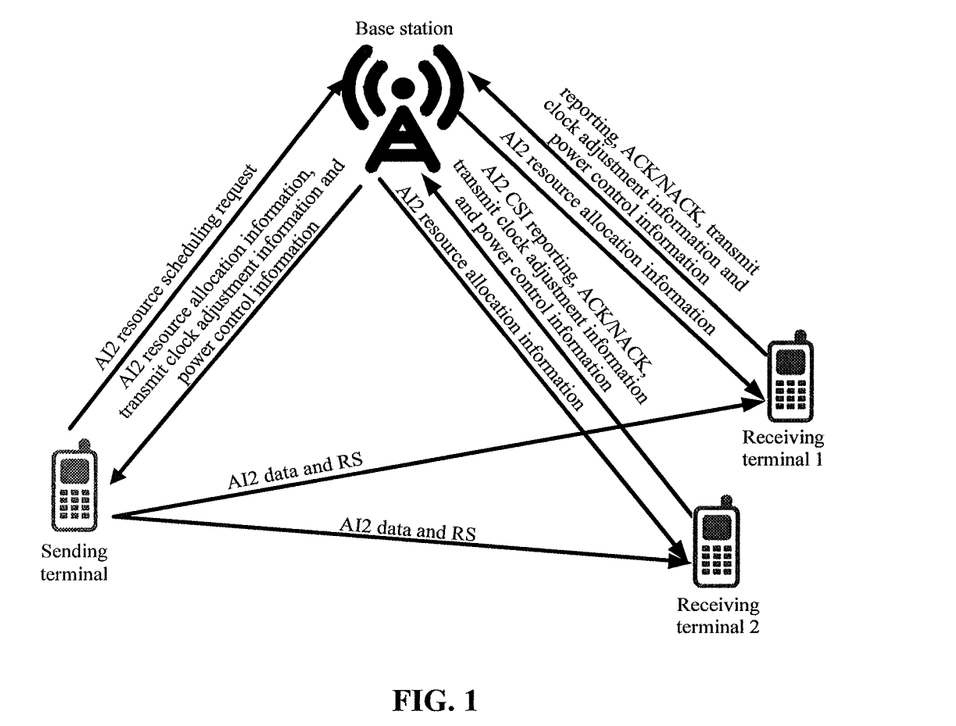
FIG. 1 is a schematic diagram of a system architecture according to an embodiment of the disclosure.

FIG. 1 is a schematic diagram of a system architecture according to an embodiment of the disclosure. A system illustrated in FIG. 1 may include a base station, a sending terminal, a receiving terminal 1 and a receiving terminal 2. Moreover, communication between the base station and the sending terminal, as well as communication between the base station and the receiving terminals, is implemented through a first-type Air Interface (AI) (called AI1 for short, a typical AI1 being a Uu interface in cellular mobile communication), and communication between the sending terminal and the receiving terminals is implemented through a second-type AI (called AI2 for short, a typical AI2 being a Sidelink AI).

It can be understood that sending and receiving in the sending terminal and the receiving terminals are relative concepts. The two receiving terminals illustrated in FIG. 1 are only intended to exemplarily describe that one sending terminal may send AI2 data to multiple receiving terminals at the same time, and not intended to limit a number of the receiving terminals.

In the embodiment of the disclosure, the base station may receive an AI2 resource scheduling request from the sending terminal, Channel State Information (CSI) sent by the receiving terminal 1 and the receiving terminal 2, confirmation information (Acknowledgement (ACK)/Negative Acknowledgement (NACK)) sent by the receiving terminal 1 and the receiving terminal 2, transmit clock adjustment information sent by the receiving terminal 1 and the receiving terminal 2, and power control information sent by the receiving terminal 1 and the receiving terminal 2 through AI1. Moreover, the base station may send allocation information about resources allocated for the sending terminal to send AI2 data (including its retransmitted version) and related signaling to the sending terminal, the receiving terminal 1 and the receiving terminal 2.

A terminal (including the sending terminal, receiving terminal 1 and receiving terminal 2 in FIG. 1) may communicate with the base station through AI1 and communicate with the other terminals through AI2, and the terminal may receive allocation information about a resource allocated by the base station for AI2 data (including its retransmitted version) and related signaling, AI2 synchronization signals of the other terminals, AI2 broadcast channels of the other terminals, AI2 Reference Signals (RSs) of the other terminals and AI2 data sent by the other terminals. The terminal may report an AI2 resource scheduling request, CSI, confirmation information, transmit clock adjustment information and power control information to the base station, and the terminal may send an AI2 synchronization signal, an AI2 broadcast channel, an AI2 RS and the AI2 data sent by the other terminals to the other terminals.

Figure 2:
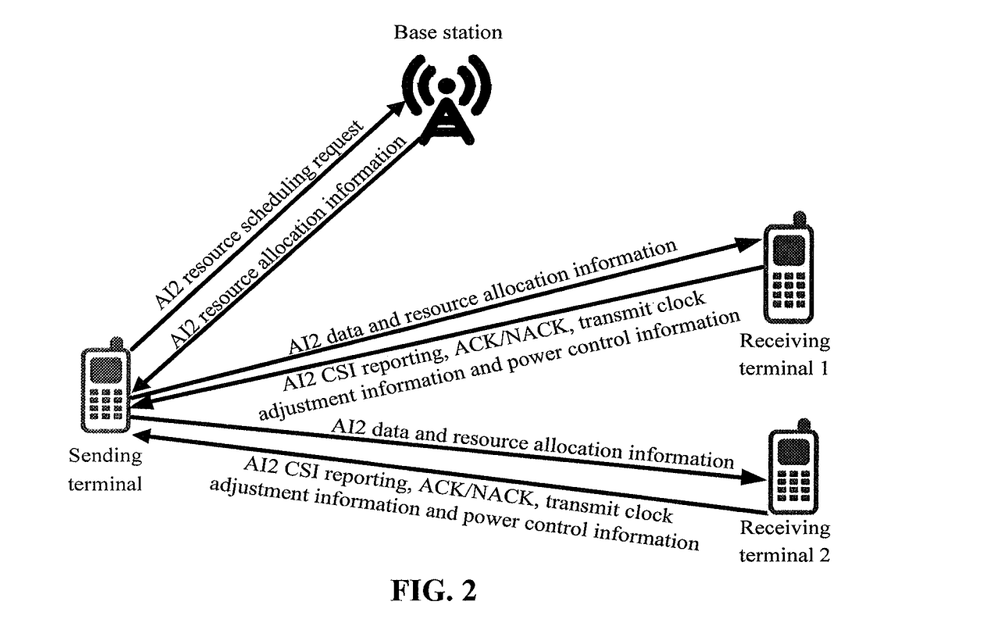
FIG. 2 is a schematic diagram of a system architecture according to another embodiment of the disclosure.

FIG. 2 is a schematic diagram of a system architecture according to another embodiment of the disclosure. A system illustrated in FIG. 2 may include a base station, a sending terminal, a receiving terminal 1 and a receiving terminal 2. Moreover, communication between the base station and the sending terminal, as well as communication between the base station and the receiving terminals, is implemented through a first-type AI (called AI1 for short, a typical AI1 being a Uu interface in cellular mobile communication), and communication between the sending terminal and the receiving terminals is implemented through a second-type AI (called AI2 for short, a typical AI2 being a Sidelink AI).

It can be understood that sending and receiving in the sending terminal and the receiving terminals are relative concepts. The two receiving terminals illustrated in FIG. 2 are only intended to exemplarily describe that one sending terminal may send AI2 data to multiple receiving terminals at the same time, and not intended to limit a number of the receiving terminals.

In the embodiment of the disclosure, the base station may receive an AI2 resource scheduling request from the sending terminal through AI1. Moreover, the base station may send allocation information about resources allocated for the sending terminal to send AI2 data and related signaling to the sending terminal.

A terminal (including the sending terminal, receiving terminal 1 and receiving terminal 2 in FIG. 2) may communicate with the base station through AI1 and communicate with the other terminals through AI2, and the terminal may receive allocation information about a resource allocated by the base station for AI2 data (including its retransmitted version) and related signaling, AI2 synchronization signals of the other terminals, AI2 broadcast channels of the other terminals, AI2 RSs of the other terminals, AI2 data sent by the other terminals, confirmation information sent by the other terminals, transmit clock adjustment information sent by the other terminals and power control information sent by the other terminals. The terminal may report an AI2 resource scheduling request to the base station, and may send an AI2 synchronization signal, an AI2 broadcast channel, AI2 CSI, an AI2 RS, confirmation information, transmit clock adjustment information and power control information to the other terminals.

Figure 3:
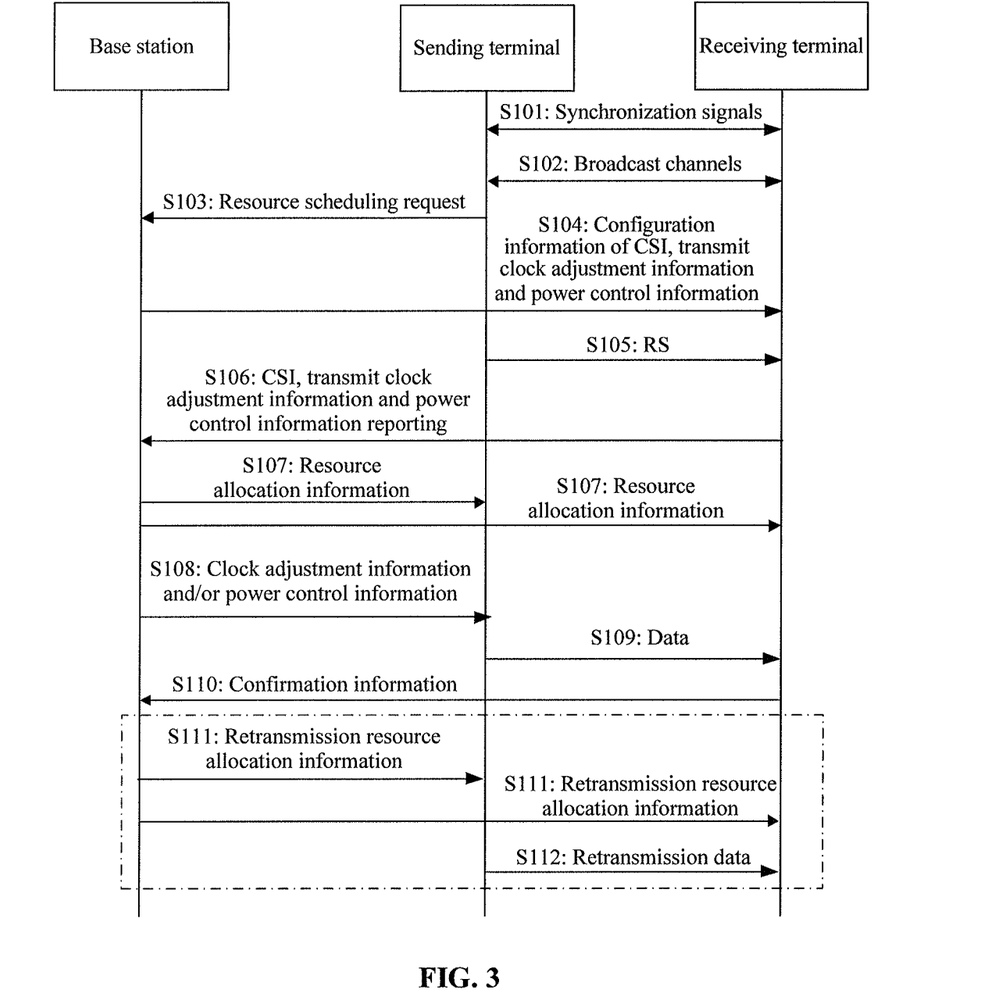
FIG. 3 is a schematic flowchart of an end-to-end data transmission method according to an embodiment of the disclosure.

FIG. 3 is a schematic flowchart of an end-to-end data transmission method according to an embodiment of the disclosure. The method illustrated in FIG. 3 is mainly applied to a system illustrated in FIG. 1, and the method 100 illustrated in FIG. 3 includes the following operations.

In S101, a sending terminal and a receiving terminal receive synchronization signals sent by the other.

Optionally, the sending terminal and the receiving terminal may send the synchronization signals to each other in a broadcast form, so that all terminal equipment communicating with the sending terminal through AI2 may receive the synchronization signal sent by the sending terminal.

Wherein, the synchronization signal may include clock information (a transmit clock) and Identity (ID) information. Therefore, when receiving the synchronization signals sent by each other, the sending terminal and the receiving terminal may obtain the clock information and ID information of each other, and then the sending terminal and the receiving terminal may complete synchronization. A synchronization process may refer to descriptions about synchronization in a conventional art and will not be elaborated in the embodiment of the disclosure.

In S102, the sending terminal and the receiving terminal receive broadcast channels sent by the other.

The sending terminal and the receiving terminal may receive the broadcast channels of each other to determine sending bandwidths of each other and determine whether they are within coverage of a base station or not.

In S103, the sending terminal sends a resource scheduling request to a base station.

It can be understood that the sending terminal may send resource scheduling requests for multiple receiving terminals to the base station at the same time, and the resource scheduling request for each receiving terminal includes information of the receiving terminal, for example, an ID of the receiving terminal.

In S104, the base station configures the receiving terminal to report CSI.

Optionally, in S104, the base station may configure the receiving terminal to report at least one of transmit clock adjustment information or power control information, then the base station forwards the transmit clock adjustment information and/or power control information reported by the receiving terminal to the sending terminal. The sending terminal may adjust a sending time for sending data according to the transmit clock adjustment information, and the sending terminal may adjust sending power for sending the data according to the power control information.

Specifically, after the base station receives the resource scheduling request sent for the receiving terminal from the sending terminal, the base station configures the receiving terminal to report the CSI from the sending terminal to the receiving terminal through AI1 between the base station and the receiving terminal, and alternatively, the base station configures the receiving terminal to report the transmit clock adjustment information and the power control information of the sending terminal for the receiving terminal through the AI1.

Optionally, the base station may indicate CSI, to be reported by the receiving terminal, of a channel between a specific sending terminal and the receiving terminal in CSI configuration information, and may indicate a resource configured for reporting the CSI by the receiving terminal through the CSI configuration information. The CSI may include at least one of the following information: a Rank Indicator (RI), a Precoding Matrix Index (PMI) or a Channel Quality Indicator (CQI).

Optionally, the base station may indicate transmit clock adjustment information, to be reported by the receiving terminal, from a specific sending terminal to the receiving terminal in clock adjustment information configuration information.

Optionally, the base station may indicate power control information, to be reported by the receiving terminal, from a specific sending terminal to the receiving terminal in power control information configuration information.

In S105, the sending terminal sends an RS to the receiving terminal.

After receiving the RS, the receiving terminal performs CSI measurement, transmission delay estimation and received power measurement according to the RS.

In S106, the receiving terminal reports the CSI to the base station.

Optionally, the receiving terminal may report transmit clock information and/or the power control information to the base station.

The CSI reported by the receiving terminal to the base station may include the specific sending terminal for which channel measurement is performed to obtain the CSI, the transmit clock adjustment information may include the specific sending terminal for which transmission delay estimation is performed to obtain the information, and the power control information may include the specific sending terminal for which received power measurement is performed to obtain the information, and for example, may include an ID of the sending terminal.

It is important to note that, in a data transmission process from the sending terminal to the receiving terminal, the receiving terminal may be required to report the transmit clock adjustment information and the power control information to the base station for many times, and a reporting time of the transmit clock adjustment information and the power control information is merely an example.

In S107, the base station sends resource allocation information to the sending terminal and the receiving terminal.

Specifically, the base station sends, to the sending terminal, resource allocation information indicating a resource through which the sending terminal may send the data to the receiving terminal, and meanwhile, the base station sends, to the receiving terminal, resource allocation information indicating the resource through which the sending terminal sends the data and a resource through which the receiving terminal may feed back confirmation information for the data sent by the sending terminal to the base station.

In S108, the base station sends transmit clock adjustment information and power control information to the sending terminal.

It is important to note that, in the data transmission process from the sending terminal to the receiving terminal, the base may be required to send the transmit clock adjustment information and the power control information to the sending terminal for many times, and the reporting time of the transmit clock adjustment information and the power control information is merely an example.

In S109, the sending terminal sends data to the receiving terminal.

The sending terminal sends the data to the receiving terminal on the resource indicated by the resource allocation information, and the receiving terminal receives the data sent by the sending terminal on the resource indicated by the resource allocation information.

It should be understood that the sending terminal may send data to multiple receiving terminals at the same time and may send different data to multiple receiving terminals by adopting mutually independent resources, thereby implementing different D2D service interaction between different terminal combinations.

In S110, the receiving terminal sends confirmation information to the base station.

The receiving terminal reports the confirmation information for the data sent by the sending terminal to the base station on the resource indicated by the resource allocation information. The confirmation information indicates whether the receiving terminal successfully receives the data sent by the sending terminal or not. Optionally, the confirmation information may be an ACK/NACK.

In S111, the base station sends retransmission resource allocation information to the sending terminal and the receiving terminal.

Optionally, when receiving failure confirmation information (NACK) sent by the receiving terminal, the base station sends the retransmission resource allocation information indicating a resource for sending retransmission data by the sending terminal to the sending terminal and sends retransmission resource allocation information indicating a resource for receiving the retransmission data by the receiving terminal to the receiving terminal.

Optionally, the base station may allocate the resource configured for retransmission of the sending terminal to the sending terminal and allocate the resource configured for receiving the retransmission data by the receiving terminal to the receiving terminal in S107. In this case, in S110, the base station is required not to perform resource allocation but only to indicate the sending terminal to perform retransmission on the previously allocated resource and indicate the receiving terminal to receive the retransmission data on the previously allocated resource.

In S112, the sending terminal sends retransmission data to the receiving terminal.

Meanwhile, the receiving terminal receives the retransmission data sent by the sending terminal on the allocated resource.

It is important to note that sequence numbers of the flow in FIG. 3 do not always represent an execution sequence of the flow. For example, S103 may be executed before S101 and S102, and a specific execution sequence is reflected by a logical relationship between the operations.

In the end-to-end data transmission method illustrated in FIG. 3, channel measurement, retransmission, clock adjustment and power control are controlled by the base station in a centralized manner, so that an end-to-end link is further simplified to transmit the synchronization signals, the broadcast channels and the data only. Within the coverage of the base station (In Coverage scenario), the data transmission method of the embodiment of the disclosure may further simplify complexity of the terminals, and improve scheduling and control accuracy and reliability.

Figure 4:
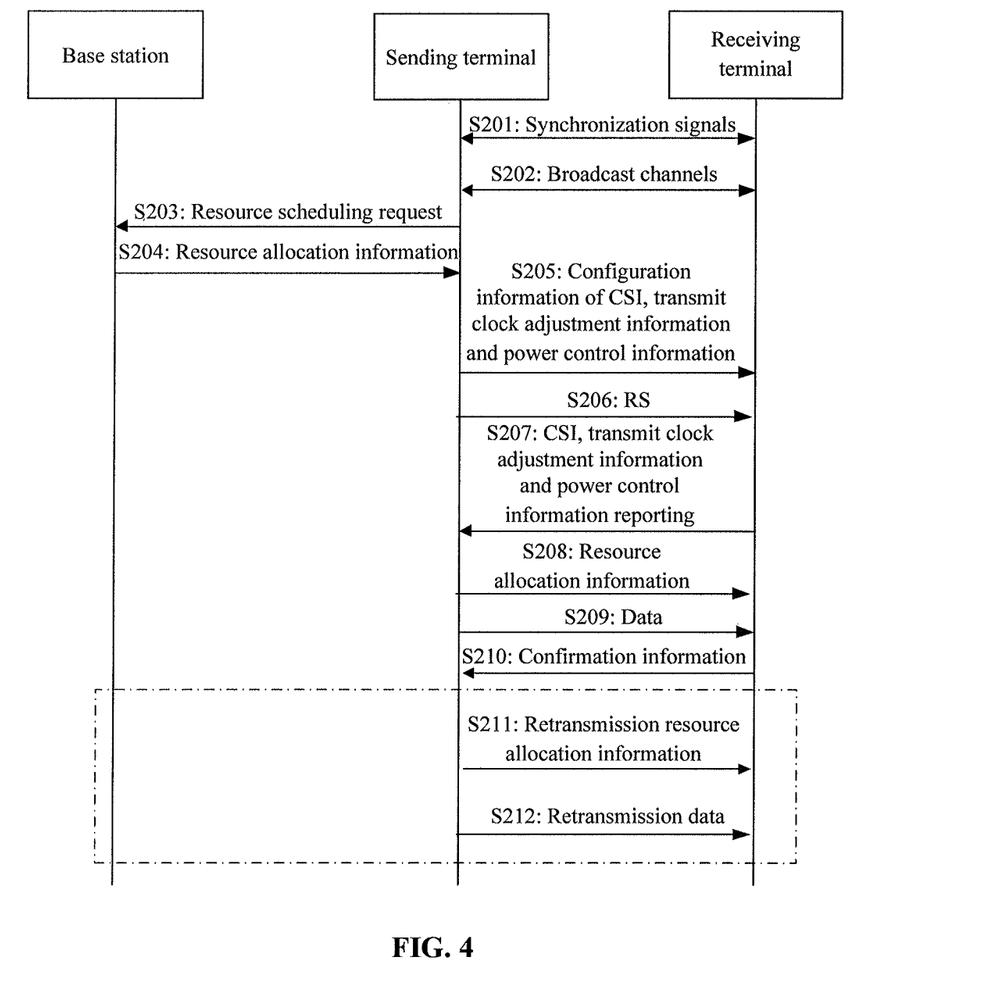
FIG. 4 is a schematic flowchart of an end-to-end data transmission method according to another embodiment of the disclosure.

FIG. 4 is a schematic flowchart of an end-to-end data transmission method according to another embodiment of the disclosure. The method illustrated in FIG. 4 is mainly applied to a system illustrated in FIG. 2, and the method 20Q illustrated in FIG. 4 includes the following operations.

In S201, a sending terminal and a receiving terminal receive synchronization signals sent by the other.

In S202, the sending terminal and the receiving terminal receive broadcast channels sent by the other.

In S203, the sending terminal sends a resource scheduling request to a base station.

S201 to S203 in FIG. 4 may refer to descriptions about the operations with the same requirements in S101 to S103 in FIG. 3 and will not be elaborated herein to avoid repetitions.

In S204, the base station sends resource configuration information to the sending terminal.

In S204, the base station may allocate, to the sending terminal through the resource configuration information, a resource for multiple receiving terminals, a resource for a certain receiving terminal, a resource for sending data and a retransmitted version thereof, sending resource configuration information and allocation information and an RS by the sending terminal, and a resource for receiving CSI, confirmation information, transmit clock adjustment information and power control information fed back by the receiving terminal.

Alternatively, in other words, the sending terminal has a resource scheduling capability. The base station may allocate available resources (which may be called as a "resource pool") to the sending terminal but does not specifically perform resource allocation on each channel, and the sending terminal independently performs resource division for a data channel, a control channel and a feedback channel between the terminals of two communication parties in the resource pool.

In S205, the sending terminal sends the resource configuration information for configuring the receiving terminal to report CSI to the receiving terminal, and configures the receiving terminal to report the CSI.

Optionally, in S205, the sending terminal may configure the resource for reporting the transmit clock adjustment information and the power control information by the receiving terminal through the resource configuration information, and configure the receiving terminal to report the transmit clock adjustment information and/or the power control information.

The resource for reporting the CSI, the transmit clock adjustment information and the power control information by the receiving terminal is selected by the sending terminal from the resource pool configured by the base station.

A specific configuration manner may refer to a configuration manner adopted by the base station for the receiving terminal in S104 and will not be elaborated herein to avoid repetitions.

In S206, the sending terminal sends an RS to the receiving terminal.

After receiving the RS, the receiving terminal performs CSI measurement according to the RS, and optionally, performs transmission delay estimation and/or received power measurement.

In S207, the receiving terminal reports the CSI, transmit clock adjustment information and power control information to the sending terminal on the resource allocated by the sending terminal.

It is important to note that, in a data transmission process from the sending terminal to the receiving terminal, the receiving terminal may be required to feed back the transmit clock adjustment information and the power control information to the sending terminal for many times and a feedback time of the transmit clock adjustment information and the power control information is merely an example.

In S208, the sending terminal sends resource allocation information to the receiving terminal.

The sending terminal sends the resource allocation information to the receiving terminal to indicate the resource for sending the data by the sending terminal to the receiving terminal, and allocate the resource for sending the confirmation information for the received data to the receiving terminal. The resource for sending the data by the sending terminal and the resource allocated to the receiving terminal for sending the confirmation information are part of the resources allocated to the sending terminal by the base station and are selected by the sending terminal from the resource pool configured by the base station.

In S209, the sending terminal sends data to the receiving terminal.

The sending terminal sends the data to the receiving terminal on the resource selected in S208, and the receiving terminal receives the data sent by the sending terminal on the resource indicated by the resource allocation information received in S208.

In S210, the receiving terminal sends confirmation information to the sending terminal.

The receiving terminal sends the confirmation information on the resource indicated by the resource allocation information received in S208.

In S211, the sending terminal sends retransmission resource allocation information to the receiving terminal.

Specifically, when the sending terminal receives failure confirmation information sent by the receiving terminal, the sending terminal allocates a resource for receiving retransmission data to the receiving terminal through the retransmission resource allocation information. The resource is selected by the sending terminal from the resource pool allocated by the base station.

In S212, the sending terminal sends retransmission data to the receiving terminal.

The sending terminal sends the retransmission data to the receiving terminal on the resource selected in S211, and the receiving terminal receives the retransmission data sent by the sending terminal on the resource.

According to the end-to-end data transmission method illustrated in FIG. 4, the base station schedules a certain number of resources to the sending terminal at first, then the sending terminal schedules specific resources for the data channel, control channel and feedback channel between terminal equipment of the two communication parties from the resources allocated by the base station, and the sending terminal receives the feedback information, channel measurement result, transmit clock adjustment information and power control information for the data sent by the sending terminal from the receiving terminal. Therefore, data transmission, retransmission, link adaptation, clock adjustment and power control for a link between a receiver and a sender may be completed under the control of the sending terminal, cellular mobile communication interface resources and a processing capability of the base station are saved, adaptive transmission with a shorter delay is implemented, and the method may be applied into a Partial Coverage scenario.

Figure 5:
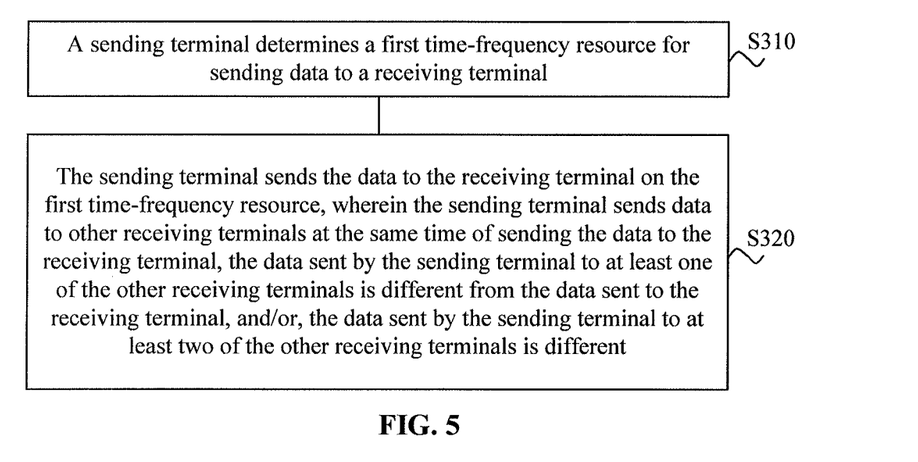
FIG. 5 is a schematic flowchart of an end-to-end data transmission method according to another embodiment of the disclosure.

FIG. 5 is a schematic flowchart of an end-to-end data transmission method according to another embodiment of the disclosure. As illustrated in FIG. 5, the method 300 includes the following operations.

In S310, a sending terminal determines a first time-frequency resource for sending data to a receiving terminal.

In S320, the sending terminal sends the data to the receiving terminal on the first time-frequency resource.

Wherein, the sending terminal sends data to other receiving terminals at the same time of sending the data to the receiving terminal, the data sent by the sending terminal to at least one of the other receiving terminals is different from the data sent to the receiving terminal, and/or, the data sent by the sending terminal to at least two of the other receiving terminals is different.

According to the end-to-end data transmission method of the embodiment of the disclosure, a terminal device sends different data to multiple terminal devices at the same time, and thus different D2D service interaction may be implemented between different terminal device combinations.

In the embodiment of the disclosure, optionally, a network device receives first feedback information sent by a terminal device, and the first feedback information is configured to indicate whether the terminal device successfully receives the data sent by the sending terminal or not. Moreover, when the first feedback information indicates that the terminal device fails to receive the data sent by the sending terminal, the network device sends first retransmission configuration information to the sending terminal, the first retransmission configuration information indicating a time-frequency resource allocated to the sending terminal by the network device and configured for retransmission, and sends second retransmission resource configuration information to the receiving terminal, the second retransmission resource configuration information indicating the time-frequency resource allocated to the sending terminal by the network device and configured for retransmission. Therefore, the sending terminal sends retransmission data to the receiving terminal on the time-frequency resource for retransmission, and the receiving terminal receives the retransmission data sent by the sending terminal on the time-frequency resource for retransmission.

In the embodiment of the disclosure, optionally, the sending terminal sends a first resource scheduling request to the network device, the network device sends first resource configuration information for the first resource scheduling request to the sending terminal, and the sending terminal determines a time-frequency resource indicated by the first resource configuration information as the first time-frequency resource. Moreover, the network device sends second resource configuration information to the receiving terminal, and the second resource configuration information is configured to indicate the time-frequency resource allocated to the sending terminal by the network device to the receiving terminal.

Furthermore, before the network device sends the first resource configuration information to the sending terminal, the network device sends channel state reporting resource configuration information to the receiving terminal, and then the network device receives CSI sent on a time-frequency resource indicated by the channel state reporting resource configuration information by the receiving terminal. The CSI indicates a channel state between the receiving terminal and the sending terminal and the CSI is determined by the receiving terminal according to an RS sent by the sending terminal. The network device determines the first resource configuration information and the second resource configuration information according to the received CSI.

In the embodiment of the disclosure, optionally, the receiving terminal sends at least one of second transmit clock adjustment information or second power control information to the network device. The network device sends the second transmit clock adjustment information determined according to first transmit clock adjustment information to the sending terminal when receiving the first transmit clock adjustment information, or, the network device sends the second power control information determined according to first power control information to the sending terminal when receiving the first power control information. Optionally, the network device may directly forward the received first transmit clock adjustment information to the sending terminal, and the network device may also directly forward the received first power control information to the sending terminal. The sending terminal adjusts a sending time of the data according to the second transmit clock adjustment information when receiving the second transmit clock adjustment information sent by the network device. The sending terminal adjusts sending power of the data according to the second power control information when receiving the second power control information sent by the network device.

According to the end-to-end data transmission method of the embodiment of the disclosure, channel measurement, retransmission, clock adjustment and power control are controlled by a base station in a centralized manner, so that an end-to-end link is further simplified to transmit synchronization signals, broadcast channels and the data only. Within coverage of the base station (In Coverage scenario), the data transmission method of the embodiment of the disclosure may further simplify complexity of the terminals, and improve scheduling and control accuracy and reliability.

In the embodiment of the disclosure, optionally, the first resource configuration information received by the sending terminal from the network device indicates a resource pool configured to the sending terminal by the network device, and the sending terminal may select the first time-frequency resource for sending the data from the resource pool and allocate the time-frequency resource in the resource pool to the receiving terminal.

In the embodiment of the disclosure, optionally, the sending terminal receives second feedback information sent by the receiving terminal. When the second feedback information indicates that the receiving terminal fails to receive the data sent by the sending terminal, the sending terminal sends the second retransmission resource configuration information to the receiving terminal and sends the retransmission data to the receiving terminal on a third time-frequency resource indicated by the second retransmission resource configuration information.

Furthermore, optionally, the resource indicated by the second retransmission resource configuration information sent by the sending terminal is a time-frequency resource in the resource pool which is configured for the sending terminal by the network device.

In the embodiment of the disclosure, optionally, the sending terminal sends the channel state reporting resource configuration information to the receiving terminal, wherein the channel state reporting resource configuration information is configured to indicate a time-frequency resource for reporting the CSI by the receiving terminal and the time-frequency resource for reporting the CSI is a resource in the resource pool; the sending terminal sends the RS to the receiving terminal; the sending terminal receives the CSI sent by the receiving terminal on the time-frequency resource for reporting the CSI, wherein the CSI is configured to indicate the channel state between the receiving terminal and the sending terminal, and the CSI is determined by the receiving terminal according to the RS; and the sending terminal selects the first time-frequency resource from the resource pool according to the CSI.

In the embodiment of the disclosure, optionally, the sending terminal sends a first synchronization signal to the receiving terminal, wherein the first synchronization signal includes clock information and ID information of the sending terminal, and the sending terminal receives a second synchronization signal sent by the receiving terminal, wherein the second synchronization signal includes clock information and ID information of the receiving terminal.

According to the end-to-end data transmission method of the embodiment of the disclosure, the base station schedules a certain number of resources to the sending terminal at first, then the sending terminal schedules specific resources for a data channel, control channel and feedback channel between terminal equipment of two communication parties from the resources allocated by the base station, and the sending terminal receives feedback information, channel measurement result, transmit clock adjustment information and power control information for the data sent by the sending terminal from the receiving terminal. Therefore, data transmission, retransmission, link adaptation, clock adjustment and power control for a link between a receiver and a sender may be completed under the control of the sending terminal, cellular mobile communication interface resources and a processing capability of the base station are saved, adaptive transmission with a shorter delay is implemented, and the method may be applied into a Partial Coverage scenario.

The end-to-end data transmission methods according to the embodiments of the disclosure have been described above in combination with FIG. 3 to FIG. 5. A sending terminal according to an embodiment of the disclosure will be described below in combination with FIG. 6 and FIG. 7.

Figure 6:
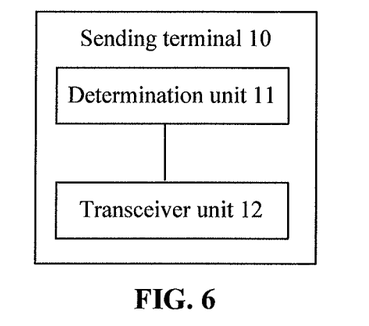
FIG. 6 is a schematic block diagram of a sending terminal according to an embodiment of the disclosure.

FIG. 6 is a schematic block diagram of a sending terminal according to an embodiment of the disclosure. As illustrated in FIG. 6, the sending terminal 10 includes a determination unit 11 and a transceiver unit 12.

The determination unit 11 is configured to determine a first time-frequency resource configured for sending data to a receiving terminal.

The transceiver unit 12 is configured to send the data to the receiving terminal on the first time-frequency resource.

Wherein, the transceiver unit 12 sends data to other receiving terminals at the same time of sending the data to the receiving terminal, the data sent by the transceiver unit 12 to at least one of the other receiving terminals is different from the data sent to the receiving terminal, and/or, the data sent by the transceiver unit to at least two of the other receiving terminals is different.

The sending terminal according to the embodiment of the disclosure may send different data to multiple terminal devices at the same time, and thus different D2D service interaction may be implemented between different terminal device combinations.

In the embodiment of the disclosure, optionally, the transceiver unit 12 is further configured to receive first retransmission resource configuration information sent by a network device, wherein the first retransmission resource configuration information is sent when the network device receives first feedback information sent by the receiving terminal and the first feedback information indicates that the receiving terminal fails to receive the data sent by the sending terminal, and send first retransmission data to the receiving terminal on a second time-frequency resource indicated by the first retransmission resource configuration information.

In the embodiment of the disclosure, optionally, the transceiver unit 12 is further configured to receive second feedback information sent by the receiving terminal, wherein the second feedback information is configured to indicate whether the receiving terminal successfully receives the data sent by the sending terminal.

In the embodiment of the disclosure, optionally, when the second feedback information indicates that the receiving terminal fails to receive the data sent by the sending terminal, the transceiver unit 12 is further configured to send second retransmission resource configuration information to the receiving terminal and send second retransmission data to the receiving terminal on a third time-frequency resource indicated by the second retransmission resource configuration information.

In the embodiment of the disclosure, optionally, the transceiver unit 12 is further configured to send a first resource scheduling request to the network device and receive first resource configuration information for the first resource scheduling request from the network device.

Wherein, the determination unit 11 is specifically configured to determine a time-frequency resource indicated by the first resource configuration information as the first time-frequency resource.

In the embodiment of the disclosure, optionally, the first resource configuration information is determined by the network device according to CSI sent by the receiving terminal, and the CSI is configured to indicate a channel state between the receiving terminal and the sending terminal.

Wherein, the transceiver unit 12 is further configured to send an RS to the receiving terminal to enable the receiving terminal to determine the CSI according to the RS.

In the embodiment of the disclosure, optionally, the transceiver unit 12 is further configured to send a second resource scheduling request to the network device and receive second resource configuration information for the second resource scheduling request from the network device, wherein the second resource configuration information indicates a resource pool configured for the sending terminal by the network device.

Wherein, the determination unit 11 is specifically configured to select the first time-frequency resource from the resource pool.

In the embodiment of the disclosure, optionally, the third time-frequency resource is a time-frequency resource in the resource pool.

In the embodiment of the disclosure, optionally, before the determination unit 11 selects the first time-frequency resource from the available resource pool, the transceiver unit 12 is further configured to send channel state reporting resource configuration information to the receiving terminal, wherein the channel state reporting resource configuration information is configured to indicate a time-frequency resource for reporting the CSI by the receiving terminal and the time-frequency resource for reporting the CSI is a resource in the resource pool, send the RS to the receiving terminal and receive the CSI sent by the receiving terminal on the time-frequency resource for reporting the CSI, wherein the CSI is configured to indicate the channel state between the receiving terminal and the sending terminal, and the CSI is determined by the receiving terminal according to the RS.

Wherein, the determination unit 11 is specifically configured to select the first time-frequency resource from the resource pool according to the CSI.

In the embodiment of the disclosure, optionally, the transceiver unit 12 is further configured to send a first synchronization signal to the receiving terminal, the first synchronization signal including clock information and ID information of the sending terminal, and receive a second synchronization signal sent by the receiving terminal, the second synchronization signal including clock information and ID information of the receiving terminal.

In the embodiment of the disclosure, optionally, before the transceiver unit 12 sends the data to the receiving terminal on the first time-frequency resource, the transceiver unit 12 is further configured to receive at least one of first transmit clock adjustment information or first power control information sent by the network device, wherein the first transmit clock adjustment information is determined by the network device according to received second transmit clock adjustment information reported by the receiving terminal, and the first power control information is determined by the network device according to received second power control information reported by the receiving terminal.

Wherein, the determination unit 11 is further configured to, when the transceiver unit 12 receives the first transmit clock adjustment information, adjust a sending time for sending the data according to the first transmit clock adjustment information, or, when the transceiver unit 12 receives the first power control information, adjust sending power for sending the data according to the first power control information.

In the embodiment of the disclosure, optionally, before the transceiver unit 12 sends the data to the receiving terminal on the first time-frequency resource, the transceiver unit 12 is further configured to receive at least one of third transmit clock adjustment information or third power control information sent by the sending terminal.

Wherein, the determination unit 11 is further configured to, when the transceiver unit 12 receives the third transmit clock adjustment information, adjust the sending time for sending the data according to the third transmit clock adjustment information, or, when the transceiver unit 12 receives the third power control information, adjust the sending power for sending the data according to the third power control information.

Figure 7:
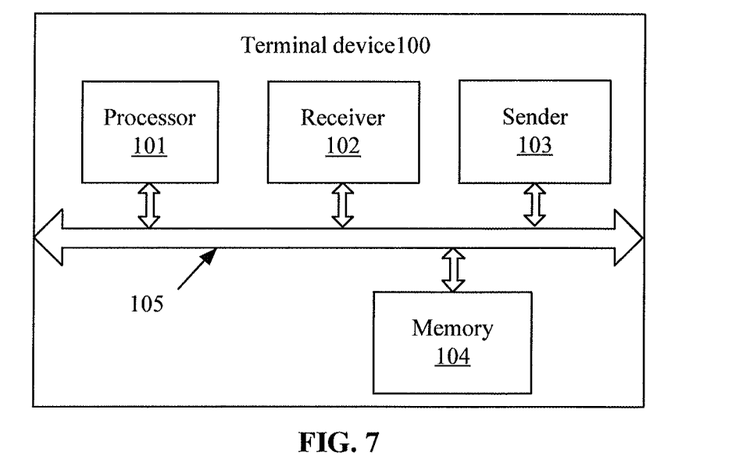
FIG. 7 is a schematic block diagram of a sending terminal according to another embodiment of the disclosure.

It is important to note that, in the embodiment of the disclosure, the determination unit 11 may be implemented by a processor and the transceiver unit 12 may be implemented by a receiver and a sender. As illustrated in FIG. 7, a terminal device 100 may include a processor 101, a receiver 102, a sender 103 and a memory 104, wherein the memory 104 may be configured to store a code executed by the processor 101 and the like.

Each component in the terminal device 100 is coupled together through a bus system 105, wherein the bus system 105 includes a data bus, and further includes a power bus, a control bus and a state signal bus.

The sending terminal 10 illustrated in FIG. 6 or the terminal device 100 illustrated in FIG. 7 may implement each process implemented by the sending terminal in the abovementioned method embodiments and will not be elaborated herein to avoid repetitions.

Figure 8:
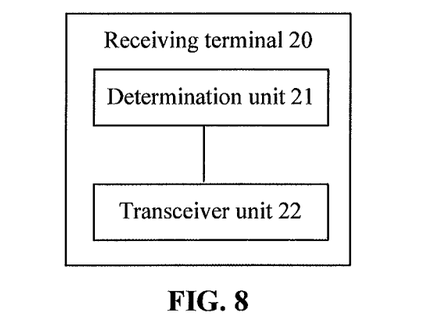
FIG. 8 is a schematic block diagram of a receiving terminal according to an embodiment of the disclosure.

A receiving terminal according to an embodiment of the disclosure will be described below in combination with FIG. 8. As illustrated in FIG. 8, the receiving terminal 20 includes a determination unit 21 and a transceiver unit 22.

The determination unit 21 is configured to determine a first time-frequency resource for receiving data sent by a sending terminal.

The transceiver unit 22 is configured to receive the data sent by the sending terminal on the first time-frequency resource.

Wherein, the sending terminal sends data to other receiving terminals at the same time of sending the data to the receiving terminal, the data sent by the sending terminal to at least one of the other receiving terminals is different from the data sent to the receiving terminal, and/or, the data sent by the sending terminal to at least two of the other receiving terminals is different.

In the embodiment of the disclosure, optionally, the transceiver unit 22 is further configured to send first feedback information to a network device, wherein the first feedback information is configured to indicate whether the receiving terminal successfully receives the data sent by the sending terminal.

In the embodiment of the disclosure, optionally, when the first feedback information indicates that the receiving terminal fails to receive the data sent by the sending terminal, the transceiver unit 22 is further configured to receive first retransmission resource configuration information sent by the network device and receive first retransmission data sent by the sending terminal on a second time-frequency resource indicated by the first retransmission resource configuration information.

In the embodiment of the disclosure, optionally, the transceiver unit 22 is further configured to send second feedback information to the sending terminal, wherein the second feedback information is configured to indicate whether the receiving terminal successfully receives the data sent by the sending terminal.

In the embodiment of the disclosure, optionally, when the second feedback information indicates that the receiving terminal fails to receive the data sent by the sending terminal, the transceiver unit 22 is further configured to receive second retransmission resource configuration information sent by the sending terminal and receive second retransmission data sent by the sending terminal on a third time-frequency resource indicated by the second retransmission resource configuration information.

In the embodiment of the disclosure, optionally, the transceiver unit 22 is further configured to receive first channel state reporting resource configuration information sent by the network device, receive an RS sent by the sending terminal, send CSI to the network device on a time-frequency resource indicated by the first channel state reporting resource configuration information, wherein the CSI is configured to indicate a channel state between the receiving terminal and the sending terminal and the CSI is determined by the receiving terminal according to the RS, and receive first resource configuration information determined according to the CSI from the network device.

Wherein, the determination unit 21 is specifically configured to determine a time-frequency resource indicated by the first resource configuration information as the first time-frequency resource.

In the embodiment of the disclosure, optionally, the transceiver unit 22 is further configured to receive second channel state reporting resource configuration information sent by the sending terminal, wherein the second channel state reporting resource configuration information is configured to indicate a time-frequency resource for reporting the CSI by the receiving terminal and the time-frequency resource for reporting the CSI is a resource in a resource pool configured for the sending terminal by the network device, receive the RS sent by the sending terminal, send the CSI to the sending terminal on the time-frequency resource for sending the CSI, wherein the CSI is configured to indicate the channel state between the receiving terminal and the sending terminal and the CSI is determined by the receiving terminal according to the RS, and receive second resource configuration information determined by the sending terminal according to the CSI.

Wherein, the determination unit 21 is specifically configured to determine a time-frequency resource indicated by the second resource configuration information as the first time-frequency resource, the time-frequency resource indicated by the second resource configuration information being a time-frequency resource selected from the resource pool by the sending terminal according to the CSI.

In the embodiment of the disclosure, optionally, the third time-frequency resource is a time-frequency resource in the resource pool.

In the embodiment of the disclosure, optionally, the transceiver unit 22 is further configured to receive a first synchronization signal sent by the sending terminal, the first synchronization signal including clock information and ID information of the sending terminal, and send a second synchronization signal to the sending terminal, the second synchronization signal including clock information and ID information of the receiving terminal.

In the embodiment of the disclosure, optionally, before the transceiver unit 22 receives the data sent by the sending terminal on the first time-frequency resource, the transceiver unit 22 is further configured to send at least one of second transmit clock adjustment information or second power control information to the network device, such that the network device sends first transmit clock adjustment information determined according to the second transmit clock adjustment information to the sending terminal when receiving the second transmit clock adjustment information and sends first sending power control information determined according to the second power control information to the sending terminal when receiving the second power control information.

In the embodiment of the disclosure, optionally, before the transceiver unit 22 receives the data sent by the sending terminal on the first time-frequency resource, the transceiver unit 22 is further configured to send at least one of third transmit clock adjustment information or third power control information to the sending terminal, such that the sending terminal adjusts a sending time for sending the data according to the third transmit clock adjustment information when receiving the third transmit clock adjustment information or adjusts sending power for sending the data according to the third power control information when receiving the third power control information.

Figure 9:
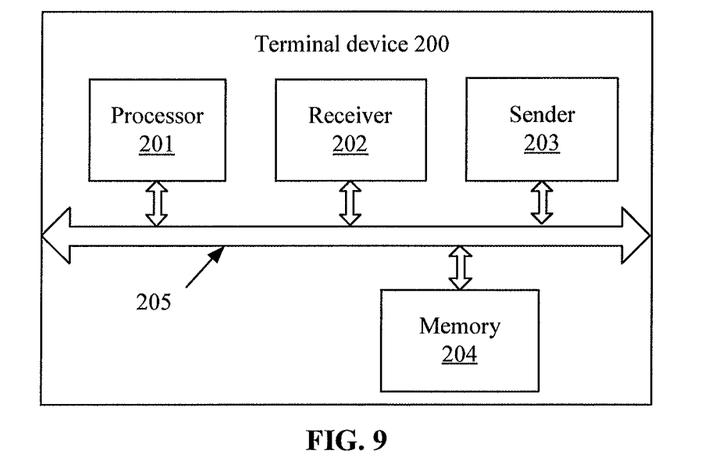
FIG. 9 is a schematic block diagram of a receiving terminal according to another embodiment of the disclosure.

It is important to note that, in the embodiment of the disclosure, the determination unit 21 may be implemented by a processor and the transceiver unit 22 may be implemented by a receiver and a sender. As illustrated in FIG. 9, a terminal device 200 may include a processor 201, a receiver 202, a sender 203 and a memory 204, wherein the memory 204 may be configured to store a code executed by the processor 201 and the like.

Each component in the terminal device 200 is coupled together through a bus system 205, wherein the bus system 205 includes a data bus, and further includes a power bus, a control bus and a state signal bus.

The receiving terminal 20 illustrated in FIG. 8 or the terminal device 200 illustrated in FIG. 9 may implement each process implemented by the receiving terminal in the abovementioned method embodiments and will not be elaborated herein to avoid repetitions.

Figure 10:
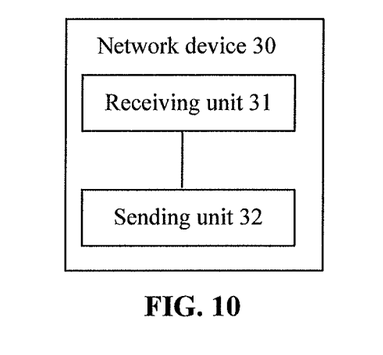
FIG. 10 is a schematic block diagram of a network device according to an embodiment of the disclosure.

A network device according to an embodiment of the disclosure will be described below in combination with FIG. 10. As illustrated in FIG. 10, the network device 30 includes a receiving unit 31 and a sending unit 32.

The receiving unit 31 is configured to receive a resource scheduling request sent by a sending terminal.

The sending unit 32 is configured to send first resource configuration information for the resource scheduling request to the sending terminal to enable the sending terminal to determine a first time-frequency resource for sending data to a receiving terminal according to the first resource configuration information.

The receiving unit 31 is further configured to receive first feedback information sent by the receiving terminal and the first feedback information is configured to indicate whether the receiving terminal successfully receives the data sent by the sending terminal on the first time-frequency resource.

In the embodiment of the disclosure, optionally, when the first feedback information indicates that the receiving terminal fails to receive the data sent by the sending terminal, the sending unit 32 is further configured to send first retransmission resource configuration information to the sending terminal to enable the sending terminal to send first retransmission data to the receiving terminal on a time-frequency resource indicated by the first retransmission resource configuration information, and send second retransmission resource configuration information to the receiving terminal to enable the receiving terminal to receive the first retransmission data sent by the sending terminal on a time-frequency resource indicated by the second retransmission resource configuration information, wherein the time-frequency resource indicated by the second retransmission resource configuration information is the same as the time-frequency resource indicated by the first retransmission resource configuration information.

In the embodiment of the disclosure, optionally, before the sending unit 32 sends the first resource configuration information for the resource scheduling request to the sending terminal, the sending unit 32 is further configured to send channel state reporting resource configuration information to the receiving terminal.

The receiving unit 31 is further configured to receive CSI sent by the receiving terminal on a time-frequency resource indicated by the channel state reporting resource configuration information, wherein the CSI is configured to indicate a channel state between the receiving terminal and the sending terminal and the CSI is determined by the receiving terminal according to an RS sent by the sending terminal.

The sending unit 32 is further configured to send the first resource configuration information determined for the resource scheduling request according to the CSI to the sending terminal.

The sending unit 32 is further configured to send second resource configuration information determined for the resource scheduling request according to the CSI to the receiving terminal to enable the receiving terminal to receive the data sent by the sending terminal on a time-frequency resource indicated by the second resource configuration information, wherein the time-frequency resource indicated by the second resource configuration information is the same as a time-frequency resource indicated by the first resource configuration information.

In the embodiment of the disclosure, optionally, the first resource configuration information is configured to indicate a resource pool configured for the sending terminal by the network device to enable the sending terminal to select the first time-frequency resource from the resource pool and allocate a time-frequency resource in the resource pool to the receiving terminal.

In the embodiment of the disclosure, optionally, the receiving unit 31 is further configured to receive at least one of first transmit clock adjustment information or first power control information sent by the receiving terminal.

The sending unit 32 is further configured to, when the receiving unit 31 receives the first transmit clock adjustment information, send second transmit clock adjustment information determined according to the first transmit clock adjustment information to the sending terminal, or, the sending unit 32 is further configured to, when the receiving unit 31 receives the first power control information, send second power control information determined according to the first power control information to the sending terminal.

Figure 11:
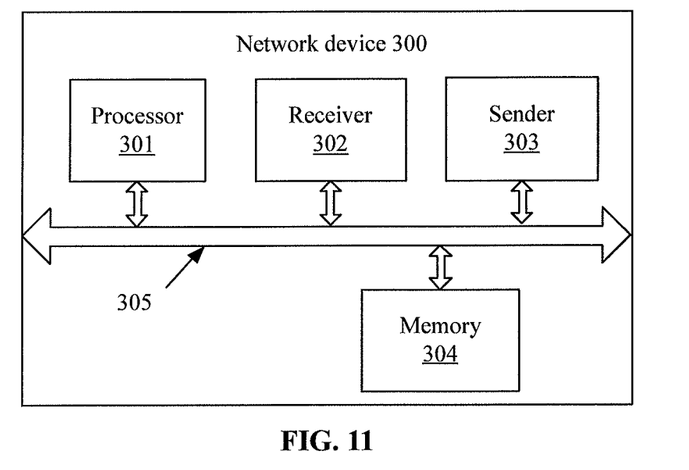
FIG. 11 is a schematic block diagram of a network device according to another embodiment of the disclosure.

It is important to note that, in the embodiment of the disclosure, the receiving unit 31 may be implemented by a receiver and the sending unit 32 may be implemented by a sender. As illustrated in FIG. 11, a network device 300 may include a processor 301, a receiver 302, a sender 303 and a memory 304, wherein the memory 304 may be configured to store a code executed by the processor 301 and the like.

Each component in the network device 300 is coupled together through a bus system 305, wherein the bus system 305 includes a data bus, and further includes a power bus, a control bus and a state signal bus.

The network device 30 illustrated in FIG. 10 or the network device 300 illustrated in FIG. 11 may implemented each process implemented by the network device in the abovementioned method embodiments and will not be elaborated herein to avoid repetitions.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An end-to-end data transmission method, comprising:
   determining, by a sending terminal, a first time-frequency resource for sending data to a receiving terminal; and
   sending, by the sending terminal, the data to the receiving terminal on the first time-frequency resource,
   wherein the sending terminal sends data to other receiving terminals while sending the data to the receiving terminal, and the sending terminal sends data to the other receiving terminals in at least one of the following modes: the data sent to at least one of the other receiving terminals is different from the data sent to the receiving terminal, or, the data sent to at least two of the other receiving terminals is different;
   wherein the method further comprises:
   sending, by the sending terminal, a first synchronization signal to the receiving terminal, wherein the first synchronization signal comprises clock information and Identity (ID) information of the sending terminal; and
   receiving, by the sending terminal, a second synchronization signal sent by the receiving terminal, wherein the second synchronization signal comprises clock information and ID information of the receiving terminal.

2. The method according to claim 1, further comprising:
   receiving, by the sending terminal, first retransmission resource configuration information sent by a network device, wherein the first retransmission resource configuration information is sent when the network device receives first feedback information sent by the receiving terminal, and the first feedback information indicates that the receiving terminal fails to receive the data sent by the sending terminal; and
   sending, by the sending terminal, first retransmission data to the receiving terminal on a second time-frequency resource indicated by the first retransmission resource configuration information.

3. The method according to claim 1, further comprising:
   receiving, by the sending terminal, second feedback information sent by the receiving terminal, wherein the second feedback information indicates whether the receiving terminal successfully receives the data sent by the sending terminal.

4. The method according to claim 3, when the second feedback information indicates that the receiving terminal fails to receive the data sent by the sending terminal, further comprising:
   sending, by the sending terminal, second retransmission resource configuration information to the receiving terminal; and
   sending, by the sending terminal, second retransmission data to the receiving terminal on a third time-frequency resource indicated by the second retransmission resource configuration information.

5. The method according to claim 1, wherein determining, by the sending terminal, the first time-frequency resource for sending the data to the receiving terminal comprises:
   sending, by the sending terminal, a first resource scheduling request to a network device;
   receiving, by the sending terminal, first resource configuration information for the first resource scheduling request from the network device; and determining, by the sending terminal, a time-frequency resource indicated by the first resource configuration information as the first time-frequency resource.

6. The method according to claim 5, wherein the first resource configuration information is determined by the network device according to Channel State Information (CSI) sent by the receiving terminal, and the CSI is configured to indicate a channel state between the receiving terminal and the sending terminal,
   wherein, before receiving, by the sending terminal, the first resource configuration information for the resource scheduling request from the network device, the method further comprises:
   sending, by the sending terminal, a Reference Signal (RS) to the receiving terminal to enable the receiving terminal to determine the CSI according to the RS.

7. The method according to claim 1, wherein determining, by the sending terminal, the first time-frequency resource for sending the data to the receiving terminal comprises:
   sending, by the sending terminal, a second resource scheduling request to the network device;
   receiving, by the sending terminal, second resource configuration information for the second resource scheduling request from the network device, wherein the second resource configuration information indicates a resource pool configured for the sending terminal by the network device; and
   selecting, by the sending terminal, the first time-frequency resource from the resource pool.

8. The method according to claim 7, wherein the third time-frequency resource is a time-frequency resource in the resource pool.

9. The method according to claim 7, before selecting, by the sending terminal, the first time-frequency resource from the resource pool, further comprising:
   sending, by the sending terminal, channel state reporting resource configuration information to the receiving terminal, wherein the channel state reporting resource configuration information indicates a time-frequency resource for reporting CSI by the receiving terminal and the time-frequency resource for reporting the CSI is a resource in the resource pool;
   sending, by the sending terminal, an RS to the receiving terminal; and
   receiving, by the sending terminal, the CSI sent by the receiving terminal on the time-frequency resource for reporting the CSI, wherein the CSI is configured to indicate a channel state between the receiving terminal and the sending terminal, and the CSI is determined by the receiving terminal according to the RS,
   wherein selecting, by the sending terminal, the first time-frequency resource from the resource pool comprises:
   selecting, by the sending terminal, the first time-frequency resource from the resource pool according to the CSI.

10. The method according to claim 1, before sending, by the sending terminal, the data to the receiving terminal on the first time-frequency resource, further comprising:
    receiving, by the sending terminal, at least one of first transmit clock adjustment information or first power control information sent by a network device, wherein the first transmit clock adjustment information is determined by the network device according to received second transmit clock adjustment information reported by the receiving terminal, and the first power control information is determined by the network device according to received second power control information reported by the receiving terminal; and
    responsive to receiving the first transmit clock adjustment information, adjusting, by the sending terminal, a sending time for sending the data according to the first transmit clock adjustment information, or,
    responsive to receiving the first power control information, adjusting, by the sending terminal, sending power for sending the data according to the first power control information.

11. The method according to claim 1, before sending, by the sending terminal, the data to the receiving terminal on the first time-frequency resource, further comprising:
    receiving, by the sending terminal, at least one of third transmit clock adjustment information or third power control information sent by the receiving terminal; and
    responsive to receiving the third transmit clock adjustment information, adjusting, by the sending terminal, a sending time for sending the data according to the third transmit clock adjustment information, or,
    responsive to receiving the third power control information, adjusting, by the sending terminal, sending power for sending the data according to the third power control information.

12. An end-to-end data transmission method, comprising:
    determining, by a receiving terminal, a first time-frequency resource for receiving data sent by a sending terminal; and
    receiving, by the receiving terminal, the data sent by the sending terminal on the first time-frequency resource,
    wherein the sending terminal sends data to other receiving terminals while sending the data to the receiving terminal, and the sending terminal sends data to the other receiving terminals in at least one of the following modes: the data sent to at least one of the other receiving terminals is different from the data sent to the receiving terminal, or, the data sent to at least two of the other receiving terminals is different;
    wherein the method further comprises:
    receiving, by the receiving terminal, a first synchronization signal sent by the sending terminal, wherein the first synchronization signal comprises clock information and Identity (ID) information of the sending terminal; and
    sending, by the receiving terminal, a second synchronization signal to the sending terminal, wherein the second synchronization signal comprises clock information and ID information of the receiving terminal.

13. The method according to claim 12, further comprising:
    sending, by the receiving terminal, first feedback information to a network device, wherein the first feedback information being indicates whether the receiving terminal successfully receives the data sent by the sending terminal.

14. The method according to claim 13, when the first feedback information indicates that the receiving terminal fails to receive the data sent by the sending terminal, further comprising:
    receiving, by the receiving terminal, first retransmission resource configuration information sent by the network device;
    receiving, by the receiving terminal, first retransmission data sent by the sending terminal on a second time-frequency resource indicated by the first retransmission resource configuration information.

15. The method according to claim 12, further comprising:

sending, by the receiving terminal, second feedback information to the sending terminal, wherein the second feedback information indicates whether the receiving terminal successfully receives the data sent by the sending terminal.

16. The method according to claim 15, when the second feedback information indicates that the receiving terminal fails to receive the data sent by the sending terminal, further comprising:

receiving, by the receiving terminal, second retransmission resource configuration information sent by the sending terminal; and receiving, by the receiving terminal, second retransmission data sent by the sending terminal on a third time-frequency resource indicated by the second retransmission resource configuration information.

17. The method according to claim 12, wherein determining, by the receiving terminal, the first time-frequency resource for receiving the data sent by the sending terminal comprises:

receiving, by the receiving terminal, first channel state reporting resource configuration information sent by the network device;

receiving, by the receiving terminal, a Reference Signal (RS) sent by the sending terminal;

sending, by the receiving terminal, Channel State Information (CSI) to the network device on a time-frequency resource indicated by the first channel state reporting resource configuration information, wherein the CSI is configured to indicate a channel state between the receiving terminal and the sending terminal, and the CSI is determined by the receiving terminal according to the RS;

receiving, by the receiving terminal, first resource configuration information determined according to the CSI from the network device; and determining, by the receiving terminal, a time-frequency resource indicated by the first resource configuration information as the first time-frequency resource.

18. The method according to claim 12, wherein determining, by the receiving terminal, the first time-frequency resource for receiving the data sent by the sending terminal comprises:

receiving, by the receiving terminal, second channel state reporting resource configuration information sent by the sending terminal, wherein the second channel state reporting resource configuration information indicates a time-frequency resource for reporting CSI by the receiving terminal, and the time-frequency resource for reporting the CSI is a resource in a resource pool configured for the sending terminal by the network device;

receiving, by the receiving terminal, an RS sent by the sending terminal;

sending, by the receiving terminal, the CSI to the sending terminal on the time-frequency resource for sending the CSI, wherein the CSI is configured to indicate a channel state between the receiving terminal and the sending terminal, and the CSI is determined by the receiving terminal according to the RS;

receiving, by the receiving terminal, second resource configuration information determined by the sending terminal according to the CSI; and determining, by the receiving terminal, a time-frequency resource indicated by the second resource configuration information as the first time-frequency resource, wherein the time-frequency resource indicated by the second resource configuration information is a time-frequency resource selected from the resource pool by the sending terminal according to the CSI.

19. A sending terminal, comprising: a processor and a transceiver, wherein:

a processor, configured to determine a first time-frequency resource for sending data to a receiving terminal; and a transceiver, configured to send the data to the receiving terminal on the first time-frequency resource, wherein the transceiver sends data to other receiving terminals while sending the data to the receiving terminal, and the transceiver sends data to the other receiving terminals in at least one of the following modes: the data sent to at least one of the other receiving terminals is different from the data sent to the receiving terminal, or, the data sent to at least two of the other receiving terminals is different; and wherein the transceiver is further configured to:

send a first synchronization signal to the receiving terminal, wherein the first synchronization signal comprises clock information and Identity (ID) information of the sending terminal, and receive a second synchronization signal sent by the receiving terminal, wherein the second synchronization signal comprises clock information and ID information of the receiving terminal.

* * * * *